United States Patent Office 3,310,578
Patented Mar. 21, 1967

3,310,578
SUBSTITUTED SILANES
Ben A. Bluestein, Schenectady, N.Y., assignor to General Electric Company, a corporation of New York
No Drawing. Filed Dec. 20, 1963, Ser. No. 332,243
14 Claims. (Cl. 260—448.8)

This application is directed to a new class of substituted silanes. More particularly, this invention is directed to a new class of substituted silanes containing a substituent attached to silicon through a carbon-oxygen-silicon linkage which substituent exhibits many of the characteristics of substituents attached to silicon through silicon-carbon linkages.

The chemistry of silicones is based on the early discovery that compounds containing organic groups attached to silicon through silicon-carbon linkages have a wide variety of uses. For example, those materials containing four hydrocarbon groups attached to silicon have found utility as heat transfer media, while those containing from one to four silicon-bonded hydrocarbon groups have been useful to varying degrees in the manufacture of polymeric silicone fluids, resins and elastomers. These organosilicon compounds containing from one to three silicon-bonded hydrocarbon groups have had the remaining valences of silicon satisfied by hydrolyzable radicals, including alkoxy radicals. Illustrative of alkoxy radicals found in various organoalkoxysilanes have been the methoxy radical, ethoxy radical, butoxy, t-butoxy, etc. In the manufacture of silicones from such organoalkoxysilanes, the alkoxy groups are readily hydrolyzed from the organoalkoxysilane forming an alkanol and an organosilicon compound containing silicon-bonded hydroxyl groups. These silicon-bonded hydroxyl groups have condensed with each other to form siloxane linkages.

The utility of the prior organosilicon compounds has been based on the fact that the silicon-bonded hydrocarbon groups have not been subject to hydrolysis or, stated alternatively, the silicon-carbon linkage has not been subject to hydrolysis and thus the mode of condensation of organochlorosilanes has been controllable. For example, dimethyldiethoxysilane can be hydrolyzed and condensed only to linear dimethylpolysiloxanes which, depending upon the state of condensation, can vary from low viscosity fluids up to a high viscosity gum. These materials have found wide acceptance in the art.

Compounds containing only one silicon-bonded hydrocarbon group have found less utility in the art since the tendency of materials containing only one silicon-bonded hydrocarbon group is to form gels of relatively limited utility. Therefore, the prime direction of the art has been in the development of dihydrocarbon-substituted silanes which could be hydrolyed to form the most desired products of commerce. The formation of silicon-carbon linkage is accomplished through rather complicated procedures. For example, in the most commonly practiced procedure, methyl chloride is passed over heated silicon in the presence of catalysts at elevated temperatures and pressure to form methylchlorosilanes. In another procedure, an organosilicon compound containing silican-bonded hydrogen atoms, such as trichlorosilane, is added to an olefin, such as ethylene, in the presence of a suitable catalyst to form ethyltrichlorosilane. Neither of the above procedures is as simple as the reaction of a silicon-chlorine atom with the hydroxyl group of a carbinol to form a silicon-bonded alkoxy group. However, as has been explained above, conventional silicon-bonded alkoxy groups are hydrolyzable and therefore, prior to the present invention, have not been useful as replacements for silicon-bonded hydrocarbon groups or other groups attached to silicon through silicon-carbon linkages.

The present invention is based on my discovery of a class of organosilicon compounds containing a silicon-bonded $\beta,\beta,\beta$-trichloro-t-butoxy group (hereinafter referred to as "trichloro-t-butoxy"). Unexpectedly, it has been found that this silicon-bonded trichloro-t-butoxy group has many of the attributes of hydrocarbon groups attached to silicon through silicon-carbon linkages and therefore, for many applications, a silicon-bonded trichloro-t-butoxy group can be employed in the manufacture of silanes which, prior to the present invention, would have required a silicon-bonded organic group attached to silicon through a silicon-carbon linkage. As is well known in the art, the trichloro-t-butoxy group has the formula:

(1) 

and is derived from $\beta,\beta,\beta$-trichloro-t-butyl alcohol.

More particularly, the compositions within the scope of the present invention can be described as silanes having the four valences of silicon satisfied by from one to two silicon-bonded trichloro-t-butoxy groups, up to three silicon-bonded hydrolyzable groups and up to three silicon-bonded radicals selected from the class consisting of monovalent hydrocarbon radicals and halogenated monovalent hydrocarbon radicals. Alternatively, the silanes within the scope of the present invention can be described as having the formula:

(2) 

where $a$ is an integer having a value of from 1 to 2, inclusive, $b$ is a whole number equal to from 0 to 3, inclusive, the sum of $a$ plus $b$ is equal to from 1 to 4, inclusive, R is a member selected from the class consisting of monovalent hydrocarbon radicals and halogenated monovalent hydrocarbon radicals and X is a member selected from the class consisting of hydroxyl groups and hydrolyzable groups.

Illustrative of the various radicals represented by R in Formula 2 are alkyl radicals, e.g., methyl, ethyl, propyl, butyl, octyl, etc. radicals; aryl radicals, e.g., phenyl, naphthyl, tolyl, xylyl, etc. radicals; aralkyl radicals, e.g. benzyl, phenylethyl, etc. radicals; alkenyl radicals, e.g., vinyl, allyl, etc. radicals; cycloaliphatic radicals, e.g., cyclohexyl, cycloheptyl, cyclohexenyl, etc. radicals; halogenated monovalent hydrocarbon radicals, e.g., chloromethyl, chloromethylvinyl, dibromophenyl, trifluoromethylphenyl, etc. radicals. Preferably, the radicals represented by R of Formula 2 are methyl and phenyl radicals, with the preferred specific radical being phenyl. Illustrative of the hydrolyzable groups represented by X of Formula 2 are halogens, e.g., chlorine and bromine; alkoxy radicals, e.g., preferably lower alkoxy radicals such as methoxy, ethoxy, propoxy, butoxy, t-butoxy, etc. radicals; acyloxy radicals, e.g., preferably lower aliphatic monoacyl radicals, e.g., acetoxy, proprionoxy, butoxy, etc. radicals.

Illustrative of specific trichloro-t-butoxy-silanes within the scope of Formula 2 are trimethyltrichloro-t-butoxysilane, dimethyl-bis-(trichloro-t-butoxy)-silane, dimethyltrichloro-t-butoxychlorosilane, methyl-bis-(trichloro-t-butoxy) chlorosilane, trichloro - t - butoxytriacetoxysilane, bis-trichloro-t-butoxy)diacetoxysilane, methyltrichloro-t-butoxydiacetoxysilane, methyltrichloro-t-butoxydichlorosilane, ethyltrichloro-t-butoxydiacetoxysilane, triphenyltrichloro-t-butoxysilane, diphenyl - bis - (trichloro-t-butoxysilane, phenyltrichloro-t-butoxydichlorosilane, phenyltrichloro-t-butoxysilanediol, phenylmethyltrichloro-t-butoxysilanol, phenyltrichloro-t-butoxydiacetoxysilane, methylethyltrichloro-t-butoxychlorosilane, etc.

The existance of the trichloro-t-butoxysilanes of Formula 2 is totally unexpected since the attempted formation of such compounds by conventional means results in failure. For example, the accepted method for forming a compound such as phenyltriethoxysilane is by reacting phenyltrichlorosilane with ethanol as, for example, by heating at the reflux temperature of ethanol to form silicon-bond ethoxy radicals with the evolution of hydrogen chloride. When phenyltrichlorosilane is refluxed with β,β,β-trichloro-t-butanol, no reaction whatsoever occurs.

The completely unexpected feature of the silanes of the present invention is the hydrolytic stability of the silicon-bonded trichloro-t-butoxy group. The hydrolytic stability of this group is orders of magnitude greater than the hydrolytic stability of groups which are reputed to be relatively stable, such as the t-butoxy group. The hydrolytic stability is so great that compounds containing both silicon-bonded trichloro-t-butoxy groups and silicon-bonded hydrolyzable groups can be reacted under hydrolysis conditions to form polysiloxanes by the hydrolysis of the hydrolyzable groups and condensation of the resulting silanols. For example, methyltrichloro-t-butoxydichlorosilane can be hydrolyzed and condensed to a polymethyltrichloro-t-butoxysilane gum under acid or basic conditions. In contrast to this, when methyl-t-butoxydichlorosilane is reacted under similar conditions, a mixture of materials including cross-linked gels is obtained.

As previously mentioned, the trichloro-t-butoxysilanes of Formula 1 cannot be prepared by the reaction of an organochlorosilane and trichloro-t-butanol without the addition of further materials. Likewise, the attempted reaction of an organochlorosilane and trichloro-t-butanol in an acid medium fails to produce the trichloro-t-butoxysilanes of Formula 1. However, it has been discovered that trichloro-t-butoxysilanes of formula:

(3)     [Cl$_3$CC(CH$_3$)$_2$O]$_a$(R)$_b$SiCl$_{4-a-b}$ where R, $a$ and $b$ are as previously defined can be prepared by effecting reaction between an organochlorosilane having the formula:

(4)     (R)$_b$SiCl$_{4-b}$ where R and $b$ are as previously defined and trichloro-t-butanol in the presence of a hydrogen chloride acceptor, such as tertiary amine, including pyridine and dimethylaniline. This reaction is preferably effected in the presence of a solvent for the trichloro-t-butanol and the organochlorosilane, which is inert to the reactants under the conditions of the reaction. Suitable solvents include conventional aromatic hydrocarbon solvents, such as toluene, xylene, benzene and the like. The reaction between the organochlorosilane and the trichloro-t-butanol results in the substitution of one or two of the available silicon-bonded chlorine atoms with a silicon-bonded trichloro-t-butoxyl group. Where some silicon-bonded chlorine atoms remain after this substitution, the silicon-bonded chlorine atoms can be replaced with a hydroxyl group or one of the hydrolyzable groups represented by X of Formula 2 by conventional means. For example, other halogens can be substituted for the chlorine by reaction of the resulting trichloro-t-butoxychlorosilane with another hydrohalic acid. Alkoxy groups can be substituted by refluxing the mixture with a suitable alkanol. Acyloxy groups can be substituted by reacting the trichloro-t-butoxychlorosilanes with a suitable acid anhydride.

In forming the trichloro-t-butoxysilane of Formula 3 from the organochlorosilane of Formula 4 and trichloro-t-butanol, the proportions of reactants are selected so as to provide one mole of trichloro-t-butanol per mole of silicon-bonded chlorine it is desired to replace in the organochlorosilane of Formula 4. Likewise, it is desirable to employ approximately one mole of the hydrogen chloride acceptor per mol of the trichloro-t-butanol. Finally, the amount of solvent employed is merely the amount required to form a solution of convenient concentration. For example, satisfactory results are obtained when the solvent is employed in an amount equal to from 0.25 to 10 parts solvent, per part by weight of the remaining components of the reaction mixture. The reaction is conveniently effected by first heating a xylene solution of trichloro-t-butanol to reflux to remove any water of hydration by azeotropic distillation. Thereafter the organochlorosilane of Formula 4 and the hydrogen halide acceptor are added to the reaction mixture at a temperature of from about 25 to 125° C. depending upon the particular organochlorosilane employed and finally the reaction mixture is allowed to stand until all of the hydrochloride of the hydrogen chloride acceptor has precipitated. This precipitate is removed and the filtrate is fractionally distilled to isolate the desired trichloro-t-butoxychlorosilane.

The following examples are illustrative of the practice of my invention and are not intended for purposes of limitation. All parts are by weight.

*Example 1*

A mixture of 177 parts of β,β,β-trichloro-t-butanol and 40 parts xylene was heated at reflux and 9 parts of water of hydration of the trichloro-t-butanol was removed in a trap. Thereafter, 212 parts phenyltrichlorosilane was added to the solution and 90 parts pyridine was added dropwise while the temperature was kept below 100° C. The resulting mixture was then heated to 150° C. and thereafter cooled. The precipitate of pyridine hydrochloride was filtered and the filtrate was fractionally distilled to yield 294 parts of phenyl-β,β,β-trichloro-t-butoxydichlorosilane, which boiled at 113 to 115° C. at 0.5 millimeter. Analysis of this material showed the presence of 20.1 percent hydrolyzable chlorine, which is the theoretical value.

*Example 2*

To a reaction vessel containing 2,000 parts water was added 100 parts of the phenyltrichloro-t-butoxy-dichlorosilane prepared in Example 1 and the reaction mixture was vigorously stirred for 3.5 hours. The resulting solid material was filtered and washed a number of times with water. The solid material was recrystallized from benzene to give 62 parts of phenyl-(β,β,β-trichloro-t-butoxysilanediol which was a white solid melting at 145 to 147° C. Chemical analysis of this material showed the presence of 11.0 percent hydroxy groups as compared with the theoretical value of 10.8 percent.

*Example 3*

Into a reaction vessel was added 200 parts trichloro-t-butanol containing 5 percent water and 800 parts toluene. This reaction mixture was heated while water was removed by azeotropic distillation and thereafter 40 parts toluene was removed. This reaction mixture was cooled to 50° C. and 130 parts dimethylaniline was added. The reaction mixture was then further cooled to room temperature at which time 110 parts trimethylchlorosilane was added. The reaction mixture was then maintained for 24 hours with stirring at a temperature of 35° C. At the end of this time, the reaction mixture was cooled to room temperature, a dimethylaniline hydrochloride precipitate was removed by filtration, and the filtrate was fractionally distilled to yield trimethyl-β,β,β-trichloro-t-butoxysilane having a boiling point of 95 to 98° C. at 20 millimeters.

*Example 4*

To a reaction vessel was added 200 parts hydrated trichloro-t-butanol and 800 parts toluene and the reaction mixture was heated and the water of hydration was removed by azeotropic distillation and thereafter 40 additional parts of toluene were removed. This resulted in 190 parts of anhydrous trichloro-t-butanol. This reaction mixture was cooled to about 75° C. and 130 parts dimethylaniline was added. The reaction mixture was then cooled to room temperature and 134 parts of silicon tetrachloride was added with stirring. The reaction mixture was then heated to a temperature of 112° C. and then allowed to cool, during which time dimethylaniline hydrochloride precipitated. The solution was decanted from the precipitate, filtered and fractionally distilled to produce 285 parts of β,β,β-trichloro-t-butoxytrichlorosilane having a boiling point of 70° C. at 2 millimeters.

*Example 5*

The 285 parts of the trichloro-t-butoxytrichlorosilane obtained in Example 4 was mixed with 306 parts of acetic anhydride, and acetyl chloride was distilled from the reaction mixture. Thereafter, excess acetic anhydride was stripped at 2.5 millimeters and the mixture was fractionally distilled yielding β,β,β-trichloro-t-butoxytriacetoxysilane which was a white solid melting at 110° C. and boiling at 120 to 130° C. at 0.01 millimeter.

*Example 6*

To a reaction vessel was added a mixture of 200 parts trichloro-t-butanol and 50 parts xylene and the reaction mixture was refluxed to remove 10 parts of water of hydration. The resulting solution was cooled to room temperature and 100 parts pyridine was added and then 150 parts methyltrichlorosilane was added dropwise. The resulting mixture was then heated to 100° C., cooled, the pyridine hydrochloride was filtered, and the filtrate was fractionally distilled to produce methyl-β,β,β-trichloro-t-butoxydichlorosilane having a boiling point of 51 to 53° C. at 0.8 millimeter.

*Example 7*

To a reaction vessel was added 75 parts of the methyltrichloro-t-butoxydichlorosilane prepared in Example 6, and 26 parts of acetic anhydride. Acetyl chloride was stripped from the reaction mixture and the resulting product was fractionally distilled to yield methyl-β,β,β-trichloro-t-butoxydiacetoxysilane having a boiling point of 97 to 98° C. at 0.08 millimeter.

*Example 8*

To a reaction vessel was added 118 parts of trichloro-t-butanol and 84 parts xylene. The reaction mixture was heated at reflux to remove water of hydration of the trichloro-t-butanol. Then 50 parts of methyltrichlorosilane and 60 parts pyridine was added. The reaction mixture was then heated at reflux temperature for about 35 hours, cooled and the pyridine hydrochloride was filtered. The filtrate was fractionally distilled, yielding both methyl-β,β,β-trichloro-t-butoxydichlorosilane which was described in Example 4 and methyl bis-(β,β,β-trichloro-t-butoxy)chlorosilane. The dichlorosilane had a boiling point of 78 to 79° C. at 5 millimeters and contained 23.4% hydrolyzable chlorine as compared with the theoretical value of 24.5%. The monochlorosilane had a boiling point of 167 to 176° C. at 5 millimeters and contained 8.57% hydrolyzable chlorine as compared with the theoretical value of 8.25%.

As previously mentioned, the trichloro-t-butoxysilanes within the scope of the present invention have many uses. In fact, the utility of such materials corresponds to the utility of more conventional organochlorosilanes containing silicon-bonded hydrocarbon groups or mixtures of silicon-bonded hydrocarbon groups and silicon-bonded hydrolyzable groups. For this correlation, the silicon-bonded trichloro-t-butoxy groups are considered to be equivalent to silicon-bonded hydrocarbon groups. For example, for most applications, methyltrichloro-t-butoxydichlorosilane can be considered to be equivalent to methylphenyldichlorosilane. Thus, methyltrichloro-t-butoxydichlorosilane can be hydrolyzed and condensed to produce polymethyltrichloro-t-butoxysiloxanes which, depending upon molecular weight, are useful as silicone fluids or silicone gums which can be converted to cured silicone rubber. For example, a polymeric material containing recurring methyltrichloro-t-butoxysiloxane units and having a viscosity of about 5,000 centipoises at 25° C. is prepared by mixing methyltrichloro-t-butoxydichlorosilane with water and toluene. This results in a two phase solution from which the organic layer is decanted, yielding the desired polymethyltrichloro-t-butoxysiloxane. This material has excellent lubricating properties and the presence of the high chlorine content imparts flame retardancy to the fluid so that it can be used in hazardous environments. The compound β,β,β-trichloro-t-butoxytriacetoxysilane is useful for reaction with silanol chain-stopped diorganopolysiloxane fluids. For example, when 4 parts of this compound is mixed with 100 parts of a silanol chain-stopped dimethylpolysiloxane having a viscosity of about 3,000 centipoises at 25° C. and the resulting mixture is exposed to atmospheric moisture, the liquid is converted to a hard flexible silicone rubber within 24 hours. The compound phenyl-β,β,β-trichloro-t-butoxysilanediol is useful as an additive for reducing the structure or knit time of silicone rubber compounds.

What I claim as new and desire to secure by Letters Patent of United States is:

1. A silane having the formula,

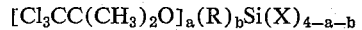

$$[Cl_3CC(CH_3)_2O]_a(R)_bSi(X)_{4-a-b}$$

where R is a member selected from the class consisting of monovalent hydrocarbon radicals and halogenated monovalent hydrocarbon radicals, X is a member selected from the class consisting of hydrolyzable groups and hydroxyl groups, $a$ has a value of from 1 to 2, inclusive, $b$ has a value of from 0 to 3, inclusive, and the sum of $a$ plus $b$ is equal to from 1 to 4, inclusive.

2. A composition within the scope of claim 1 in which X is a chlorine.

3. A composition within the scope of claim 1 in which R is methyl.

4. A composition within the scope of claim 1 in which R is phenyl.

5. A composition within the scope of claim 1 in which X is acetoxy.

6. A composition within the scope of claim 1 in which X is hydroxyl.

7. The compound phenyl-β,β,β-trichloro-t-butoxydichlorosilane.

8. The compound phenyl-β,β,β-trichloro-t-butoxysilanediol.

9. The compound trimethyl-β,β,β-trichloro-t-butoxysilane.

10. The compound β,β,β-trichloro-t-butoxytrichlorosilane.

11. The compound methyl-β,β,β-trichloro-t-butoxydichlorosilane.

12. The compound methyl-β,β,β-trichloro-t-butoxydiacetoxysilane.

13. The compound β,β,β-trichloro-t-butoxytriacetoxysilane.

14. The compound methyl-bis-(β,β,β-trichloro-t-butoxy)chlorosilane.

References Cited by the Examiner

UNITED STATES PATENTS

| | | | |
|---|---|---|---|
| 2,566,957 | 9/1951 | Pedlow et al. | 260—448.8 |
| 2,778,758 | 1/1957 | Henning | 260—448.8 X |

TOBIAS E. LEVOW, *Primary Examiner.*

J. G. LEVITT, P. F. SHAVER, *Assistant Examiners.*